(12) United States Patent
Nikoley et al.

(10) Patent No.: US 7,310,926 B2
(45) Date of Patent: Dec. 25, 2007

(54) APPARATUS FOR PRODUCING FILM TUBE FROM FILM STRIP

(75) Inventors: Wolfgang Nikoley, Mainz Kastell (DE); Edmund Frey, Wettenberg (DE); Jürgen Hanten, Bad Nauheim (DE)

(73) Assignee: Poly-Clip System GmbH & Co. KG (DE)

( * ) Notice: Subject to any disclaimer, the term of this patent is extended or adjusted under 35 U.S.C. 154(b) by 19 days.

(21) Appl. No.: 11/160,540

(22) Filed: Jun. 28, 2005

(65) Prior Publication Data

US 2006/0000188 A1    Jan. 5, 2006

(30) Foreign Application Priority Data

Jul. 2, 2004    (DE)    ............... 10 2004 032 183

(51) Int. Cl.
*B65B 43/54*    (2006.01)
*A22C 11/00*    (2006.01)

(52) U.S. Cl. ............... 53/574; 53/64; 53/550; 452/32

(58) Field of Classification Search ............ 452/21, 452/22, 31, 35, 32; 53/550, 574, 576, 51, 53/64, 366
See application file for complete search history.

(56) References Cited

U.S. PATENT DOCUMENTS

| 4,479,283 | A | * | 10/1984 | Hollingsworth | ............ 53/576 |
| 4,563,792 | A | * | 1/1986 | Niedecker | ............ 53/576 |
| 4,570,301 | A | * | 2/1986 | Beckman et al. | ............ 452/35 |
| 4,577,370 | A | * | 3/1986 | Kollross | ............ 452/35 |
| 4,640,083 | A | * | 2/1987 | Takahashi et al. | ............ 452/35 |
| 4,734,956 | A | * | 4/1988 | Frey et al. | ............ 53/550 |
| 5,067,307 | A | * | 11/1991 | Francioni et al. | ............ 53/550 |
| 5,237,794 | A | * | 8/1993 | Ballestrazzi et al. | ............ 53/550 |
| 5,600,308 | A | * | 2/1997 | Corpeny et al. | ............ 452/35 |
| 6,146,261 | A | | 11/2000 | Bienert et al. | |
| 6,669,545 | B1 | | 12/2003 | Hergott et al. | |
| 6,711,875 | B2 | * | 3/2004 | Van Rens et al. | ............ 53/550 |
| 2003/0224715 | A1 | | 12/2003 | Hergott et al. | |

FOREIGN PATENT DOCUMENTS

| DE | 34 35 948 A1 | 4/1986 |
| DE | 44 12 697 C1 | 7/1995 |
| DE | 19517127 | 11/1996 |
| DE | 10221198 | 7/2003 |
| JP | 62-45633 | * 2/1987 |
| JP | 2006-16079 | * 1/2006 |
| JP | 2006-30000 | * 2/2006 |

* cited by examiner

*Primary Examiner*—Louis Huynh
(74) *Attorney, Agent, or Firm*—Hahn Loeser & Parks LLP; Michael H. Minns

(57) ABSTRACT

An apparatus for producing film tube which can be filled with liquid, viscous or granular filling material, from a film strip, is provided wherein the apparatus comprises a filling tube which can be connected to a filling machine, a device for transforming the film strip into a film tube, a sealing device for sealing longitudinal edges of the film strip, an advance drive means for the film tube and a measuring device for determining the amount of film tube delivered by the sealing device. The measuring device includes a first sensor which detects the length of the film tube delivered by the sealing device to the film tube supply and a second sensor which detects the length of the film tube drawn off the film tube supply.

13 Claims, 1 Drawing Sheet

APPARATUS FOR PRODUCING FILM TUBE FROM FILM STRIP

This application claims the benefit of German patent application serial number 10 2004 032 183.3-27, filed Jul. 2, 2004.

TECHNICAL FIELD

The invention concerns an apparatus for producing film tube which can be filled with liquid, viscous or granular filling material, from a film strip, comprising a filling tube which can be connected to a filling machine, a transformation device surrounding the filling tube for transforming the film strip into a film tube, a sealing device arranged downstream of the transformation device in the filling expulsion direction for sealing longitudinal edges of the film strip, which are adjacent after the transformation operation, an advance drive means for the film tube and a measuring device for determining a supply amount of film tube delivered by the sealing device.

BACKGROUND OF THE INVENTION

It is known for the tubular case which is required for the production of sausages or similar portion packs to be continuously or intermittently produced by means of such an apparatus on site by longitudinal seam sealing of a film strip which is transformed into a tubular configuration. In that respect the term sealing is used to denote any kind of (non-releasable) connection of the two longitudinal edges, including for example welding as the preferred sealing process but also adhesive or the like. In the process of the general kind to which this invention relates, as is known from EP 0 908 103 A1, the film strip is drawn by the advance drive means arranged in the region of or downstream of the sealing device in the transport or filling expulsion direction, by way of a suitable transformation device (shaping shoulder) and through the sealing or welding means. The shaping shoulder surrounds the filling tube and transforms the film strip around the filling tube into a configuration such that the longitudinal edges thereof adjoin each other either in butting or overlapping relationship. Those longitudinal edges are connected together directly or by means of a sealing strip connecting the edges, in the subsequent welding or sealing device.

The film tube formed in that way is further conveyed by the advance drive means in the filling expulsion direction into a buffer portion on the filling tube, in which it is folded harmonica-like to constitute a reserve supply. A reserve supply is necessary as the filling operation takes place intermittently and the sealing operation takes place continuously in most cases and also intermittently in some cases, but at any event slower than the withdrawal of the film tube from the filling tube, which is governed by the filling expulsion during the filling operation. On the other hand, there are pauses after the filling operation, while the ends of the filled film tube are being closed by means of a so-called clip machine. Therefore the film tube continues to be produced even during the clipping pauses (stoppage of the filling arrangement) in which the filling operation is stopped. In that situation the film tube reserve supply builds up in front of a retaining means.

In order to achieve synchronisation between film tube production and the filling operation, it is known that film tube production is regulated. For that purpose the above-mentioned measuring device for determining a supply amount of the film tube is used, which typically comprises a sensor element movable with respect to the filling tube and a stationary sensor element. The movable sensor element is connected to an entrainment member which engages into the cross-section of the folded or gathered-together film tube and which at the same time forms the retaining means for the film tube supply. When the supply is increased in size, it displaces the entrainment member and the movable sensor element in the conveyor direction of the advance drive means against a return force which is applied for example by a spring (spring force) or a pneumatic element (pressure force). When film tube is taken from the supply and the supply thus decreases in size, then the return force drives the entrainment member with the movable sensor element back in the opposite direction to the conveyor direction.

In the simplest configuration of the measuring device the fixed sensor element has for example two spaced mechanical or magnetic switches or signalling devices which are respectively actuated when the movable sensor element approaches (mechanical or contact-less contact surface). In that situation the switches trigger the apparatus to be switched off or on, at a preselected maximum and minimum supply amount respectively, which is selected by a suitable relative arrangement of the switches/signalling devices and contact surfaces.

A further development of a measuring device provides for travel measurement between the movable and the stationary sensor elements, the result thereof permitting differentiated adaptation of the sealing and conveyor speed to the supply amount.

At any event however the movable sensor element is transported by the entrainment member which engages into the cross-section of the gathered-together film tube. That presupposes in each case that the reserve supply adopts a sufficiently folded configuration which is engaged by the entrainment member. Now however there are films with coatings which suffer damage due to being heavily folded. For example films with an aluminium coating are sensitive to sharp bends as the relatively brittle aluminium layer can tear at such locations, whereby both the functional and also the aesthetic properties of the film are adversely affected. The same applies for stiff film materials which, after sharp transformation thereof, can no longer be completely smoothed out and thus retain an irreversible, undesirably corrugated and wavy structure. In addition the problem arises that the folds in the film which is still hot after the sealing operation stick to each other in the event of an excessively high pressure being applied to the accumulated film material while it is forming the reserve supply.

SUMMARY OF THE INVENTION

The present invention provides an apparatus for producing film tube from a film strip, which overcomes at least one of the above-mentioned disadvantages.

The apparatus comprises a measuring device that includes a first sensor which detects the length of the film tube delivered by the sealing device to the film tube supply and a second sensor which detects the length of the film tube drawn off from the film tube supply in the filling expulsion direction.

Depending on the film material, the film tube reserve supply is typically formed directly downstream of the advance drive means, due to lack of inherent stability, with fold formation. By virtue of the measuring device according to the invention however it is possible to avoid severe fold formation because, when determining the film tube supply, the arrangement does not involve the engagement of an entrainment member which acts with a return force in opposite relationship to the advance directions. In addition the supply is determined more precisely as it is no longer ascertained by way of the (random) folding which occurs when the supply is being formed but by virtue of length measurement and difference formation, by means of suitable signal processing means, between the length of the film tube fed to the film tube supply and the length of the film tube drawn from the film tube supply. In that way, the sealing and conveyor speed can be even more accurately adapted by means of suitable regulation to the respective conditions (filling speed, cycle and the like), which in turn permits a more constant and ultimately also smaller supply to be maintained, and thus further contributes to avoiding severe folding of the film tube. Because the degree of folding is precisely not an important consideration with the apparatus according to the invention, the folding involved can be reduced, having regard to the delicacy of the film material and the minimum reserve supply amount required for a satisfactory filling procedure, with a predetermined length for the buffer section, by virtue of exact setting of the regulating procedure. While in the case of the known measuring devices the supply amount could vary in dependence on the stiffness of the film, so that, when there was a change in film, the measuring device had to be accurately adjusted in each case, it is always possible with the apparatus according to the invention to ensure a uniform supply amount and thus a manufacturing and filling procedure which is more reliable in terms of the process involved, irrespective of the film material used and without involving further adjusting measures.

In a particular embodiment, a retaining ring is arranged on the filling tube in the filling expulsion direction downstream of the advance drive means and is so adapted that the film tube supply which is built up between the advance drive means and the retaining ring is restrained when the film tube is drawn off in the film expulsion direction.

The retaining ring is typically of an outside diameter which is so matched to the inside diameter of the finished film tube that, due to lack of inherent stability, it is admittedly not pushed beyond the retaining ring by the advance drive means, but in the filling operation, due to expulsion of the filling material, can be drawn off over the retaining ring from the buffer supply. In particular, in that case, because of its undefined inside diameter, the film tube supply is restrained or from another point of view the film tube is stretched when it is being pulled off over the retaining ring. Various factors such as coefficient of friction between the film material and the retaining ring material, the elasticity of the film and the retaining ring and the like play a part in terms of adaptation of the outside diameter. If necessary the retaining ring can be easily replaced. In particular the retaining ring can also be easily displaced on the cylindrical filling tube and arrested thereon, whereby the length of the buffer section can be altered.

The second sensor can be arranged, in the filling expulsion direction, at the level of the retaining ring or downstream thereof, as the film is stretched again by being drawn from the supply, at the location of the retaining ring and downstream thereof. Preferably however the second sensor is arranged at the level of the retaining ring. This has the advantage, particularly when using a sensor which bears against the film tube, that the retaining ring serves at the same time as a counterpressure portion.

Both the first and also the second sensors of the measuring device can be embodied in various ways.

In accordance with a further advantageous configuration the first and/or second sensor has a roller which bears against the film tube or the film strip respectively upstream and downstream of the film tube supply respectively in the filling expulsion direction and a rotary speed pickup which is adapted to detect the rotation of the respective roller bearing against the film tube or the film strip respectively. That form of travel pickup—also referred to hereinafter as a counting wheel—is distinguished by its structural simplicity and low costs.

In further advantageous embodiments the first sensor has a rotary speed pickup which is adapted to detect the rotation either of a roller supplying the film strip or a roller changing the direction thereof. Strictly speaking it is not the length of the film tube delivered to the film tube supply that is measured, but the length of the film strip which is drawn from the film strip roll supply. That is effected by detecting the rotary speed or angular position of the direction-changing roller of a known periphery or the rotary speed or angular position of the supply roll and subsequent calculation having regard to the periphery—in the latter case having regard to a varying periphery.

Preferably the first sensor has a rotary speed pickup which is adapted to detect an advance travel of the advance drive means. In that case measuring the rotary speed or angular position of the advance drive means takes place, which, as is known, has a driven transport belt or transport roller which in the region of the filling tube bears in frictional engagement against the film tube which has already been transformed in shape. Stepping motors are usually employed for driving the transport belt/the transport roller. The rotary speed pickup or the first sensor is therefore preferably embodied by electronic signal processing means which detect the pulses of the stepping motor control and, with the periphery of the drive belt or the drive roller being known, convert those pulses into the advance travel.

While, in the above-indicated embodiments, the film strip or the film tube is sensed with direct contact with the sensor or a transport means including the sensor for the film strip or the film tube respectively (supply roll, direction-changing roller or drive roller), another advantageous embodiment provides that the first and/or second sensor is arranged upstream or downstream of the film tube supply respectively in the filling expulsion direction, in adjacent relationship with the film tube or the film strip respectively, and is adapted to sense in contact-free mode structures on the surface of the film strip or the film tube.

In the case of some films, such structures are originally present for example in the form of a weave or the like. Otherwise it is possible for embossing or printing to be specifically applied for the purpose of use of length measurement. The printing or embossing operation can be effected in-line, in parallel relationship with the sealing operation. The sensor involved is preferably an optical sensor (for example a CCD camera or a laser scanning sensor). Alternatively it is also possible to use an acoustic sensor. Such contact-free sensors generally have the advantage that no slippage can occur between the sensor or transport means and the film strip or the film tube respectively.

BRIEF DESCRIPTION OF THE DRAWINGS

Further objects, features and advantages of the present invention will now be described by means of the embodiments described by way of example hereinafter with reference to the accompanying drawings in which.

DETAILED DESCRIPTION OF THE DRAWINGS

Figure 1:
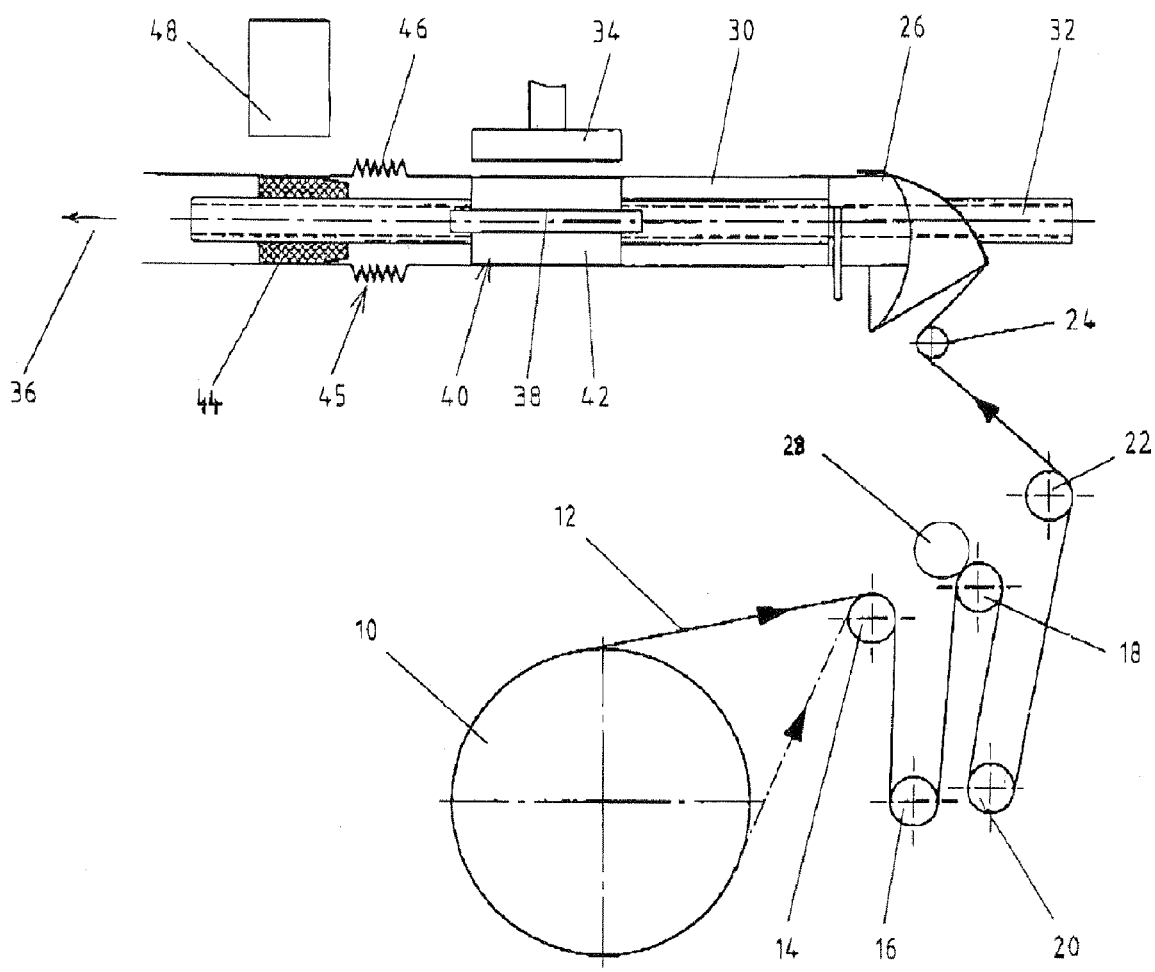
FIG. 1 shows a diagrammatic view of an embodiment of the apparatus according to the invention for producing film tube as a side view.
Figure 2:
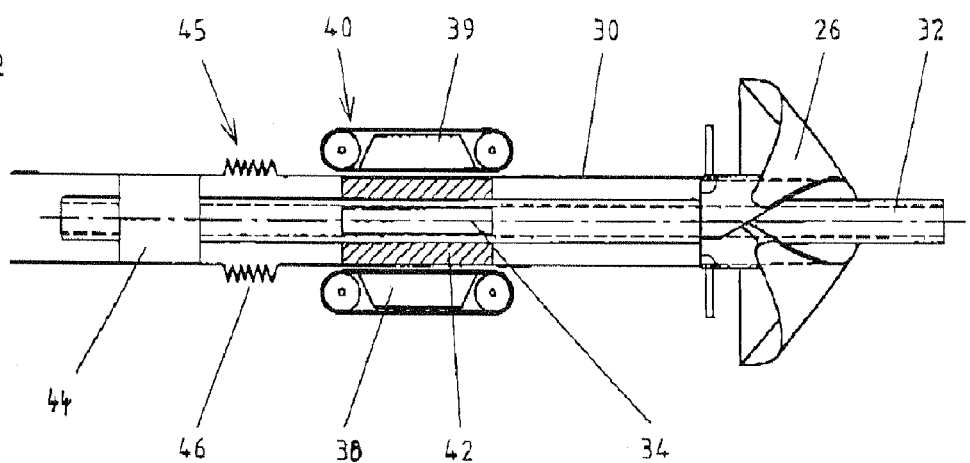
FIG. 2 shows a plan view of the embodiment of FIG. 1.

The apparatus shown in FIG. 1 has a supply roll 10 of a film strip 12 which is presented for processing. The film strip 12 is passed by way of a plurality of direction-changing rollers 14, 16, 18, 20, 22 and 24 to a shaping shoulder 26. In the region of one of the direction-changing rollers 18 a counting wheel 28 bears against the film strip 12, on the surface in opposite relationship to the direction-changing roller 18. The direction-changing roller 18 thus forms the backing roller for the counting wheel 28.

In the shaping shoulder 26 the film strip is transformed into a film tube 30 by shaping around a filling tube 32. In that situation the film tube 30 surrounds the filling tube 32 in substantially coaxial relationship. After the transformation operation the film tube has two adjacent longitudinal edges which are disposed upwardly in the view in FIG. 1 but which are not shown and which are sealed or welded in a sealing station 34 arranged downstream of the shaping shoulder 26 in the filling expulsion direction (see the arrow 36). Disposed at the same level as the sealing station 34 on respective sides of the filling tube are respective drive belts 38 and 39 of an advance drive means 40, the drive belts bearing against the outside the film tube 30. The advance drive means 40 draws the film strip in the downstream direction and under the sealing station and at the same time pushes the finished film tube in the filling expulsion direction 36. In the region of the sealing station 34 and the advance drive means 40, arranged coaxially on the filling tube 32 is a ring 42 whose outside diameter approximately corresponds to the diameter of the finished film tube 30. Both the drive belts 38, 39 and also the sealing station 34 (more precisely a sealing bar, a sealing belt or a hot air flow of the sealing station) act in a condition of being pressed against that ring 42.

Disposed downstream of the sealing station 34 in coaxial relationship on the filling tube 32 is a retaining ring 44. As the advance drive means 40 acts in the advance direction upstream of the retaining ring 44 and the film tube does not enjoy adequate inherent stability, a film tube reserve supply 46 which is folded in a concertina-like configuration is formed on a buffer section 45 between the retaining ring 44 and the advance drive means 40. Because however the severity of the folding effect is not an important consideration in the apparatus according to the invention, the folding configuration can be reduced in size, for example having regard to the delicacy of the film material, by means of a suitable choice in respect of the length of the buffer section 45 with the same storage capacity or with a predetermined length in respect of the buffer section 45 by a reduction in the amount of the reserve supply.

The film tube is then drawn over the retaining ring from the buffer supply in the filling operation in the filling expulsion direction 36. A second sensor 48 of the measuring device is disposed at the level of the retaining ring 44 or downstream thereof in the filling expulsion direction 36, that is to say at the location at which the film is stretched again by being drawn from the supply 46. Like the first sensor 28 that sensor 48 can also be in the form of a counting wheel which bears against the outside of the film tube for example in the region of the retaining ring 44 as a counterpressure portion.

The production process of film tube which can be filled with liquid, viscous or granular filling material, from a film strip, by means of the apparatus according to the invention, is described hereinafter. In a first step the film strip 12 is fed to the transformation device 28 from a film strip supply 10. In the transformation device 26 the film strip 12 is transformed into a film tube 30 by shaping around a filling tube 32 and is thereafter welded or sealed in a welding or sealing device 34 at the longitudinal edges which are disposed in mutually juxtaposed relationship or which overlap after the transformation operation, with or without the use of an additional sealing strip, thereby to form the closed film tube 30. The sealed film tube 30 is thereafter delivered by means of an advance drive means 40 from the sealing device 34 to a film tube supply 46 on the filling tube 32, from which it is withdrawn again as required due to the filling operation, wherein the length of the film tube 30 which is delivered to the film tube supply 46 and the length of the film tube 30 which is withdrawn from the film tube supply 46 is detected and passed to an (electronic) regulating system which regulates the sealing operation or the sealing speed in such a way that a predetermined supply amount of film tube, which as far as possible remains constant, is maintained.

At the beginning of operation or upon a change in the film strip, firstly, a given amount of film strip has to be pre-sealed so as to ensure satisfactory start up of the overall installation (sealing device and clipping machine). That given amount can then be maintained by measurement and regulation of the sealing speed, in accordance with the invention.

What is claimed is:

1. An apparatus for producing film tube which can be filled with liquid, viscous or granular filling material, from a film strip, the apparatus comprising:
   a filling tube which can be connected to a filling machine,
   a transformation device surrounding the filling tube for transforming the film strip into a film tube,
   a sealing device arranged downstream of the transformation device in a filling expulsion direction for sealing longitudinal edges of the film strip, the longitudinal edges are positioned adjacent to each other by the transformation device,
   an advance drive means for transporting the film tube to a buffer, the advance drive means being arranged downstream of the transformation device, and
   a device for determining a supply of film tube delivered by the advance drive means-to the buffer based on the difference between the length of film tube supplied to the buffer and the length of film tube withdrawn from the buffer absent measurement of the film tube length in the buffer, the device-including a first sensor which detects a length of the film tube delivered by the advance drive means to the buffer, a second sensor which detects a length of the film tube withdrawn from the buffer in the filling expulsion direction, and an electronic regulating system operably connecting to the first and second sensors.

2. The apparatus according to claim 1 further comprising a retaining ring, wherein the retaining ring is arranged on the filling tube in the filling expulsion direction downstream of the advance drive means and is so adapted that the film tube supply which is built up between the advance drive means and the retaining ring is restrained when the film tube is drawn off in the film expulsion direction.

3. The apparatus according to claim 2 wherein the second sensor is arranged at the level of the retaining ring.

4. The apparatus according to claim 1 wherein the first sensor has a roller bearing against the film tube or the film strip upstream of the film tube supply in the filling expulsion direction, and a rotary angle pickup which is adapted to detect the rotation of the roller bearing against the film tube or the film strip.

5. The apparatus according to claim 1 wherein the first sensor has a rotary angle pickup which is adapted to detect the rotation of a roll supplying the film strip.

6. The apparatus according to claim 1 wherein the first sensor has a rotary angle pickup which is adapted to detect the rotation of a roller which changes the direction of the film strip.

7. The apparatus according to claim 1 wherein the first sensor has a rotary angle pickup which is adapted to detect an advance travel of the advance drive means.

8. The apparatus according to claim 1 wherein the first sensor is arranged upstream of the film tube supply in the filling expulsion direction in adjacent relationship with the film tube or the film strip and is adapted to contact-free sense structures on the surface of the film strip or the film tube.

9. The apparatus according to claim 8 wherein the first sensor is an optical sensor.

10. The apparatus according to claim 1 wherein the second sensor has a roller which bears against the film tube downstream of the film tube supply in the filling expulsion direction along the filling tube and a rotary angle measuring means which is adapted to detect the rotation of the roller bearing against the film tube.

11. The apparatus according to claim 1 wherein the second sensor is arranged downstream of the film tube supply in the filling expulsion direction in adjacent relationship with the film tube and is adapted to contact-free sense structures on the surface of the film tube.

12. The apparatus according to claim 11 wherein the second sensor is an optical sensor.

13. The apparatus of claim 1, wherein the advance drive means is arranged downstream of the transformation device positioned at the same downstream location as the sealing device, and circumferentially offset from the sealing device.

* * * * *